J. W. KREILING.
CLUTCH MECHANISM.
APPLICATION FILED FEB. 19, 1913.

1,074,959.  Patented Oct. 7, 1913.

WITNESSES:
Geo. P. Kingsbury
L. F. Morrison

INVENTOR.
J. W. Kreiling
BY
ATTORNEY

UNITED STATES PATENT OFFICE.

JULIUS W. KREILING, OF CHICAGO, ILLINOIS, ASSIGNOR TO MERGENTHALER LINOTYPE COMPANY, A CORPORATION OF NEW YORK.

CLUTCH MECHANISM.

1,074,959.      Specification of Letters Patent.      Patented Oct. 7, 1913.

Application filed February 19, 1913. Serial No. 749,339.

*To all whom it may concern:*

Be it known that I, JULIUS W. KREILING, a citizen of the United States, residing at Chicago, in the county of Cook and State of Illinois, have invented certain new and useful Improvements in Clutch Mechanism, of which the following is a specification, reference being had therein to the accompanying drawing.

My invention relates to clutch mechanism, and more particularly to a form thereof adapted for use in connection with the assembler belt of a linotype machine, such as is disclosed for instance in Letters Patent of the United States to O. Mergenthaler, No. 436,532.

In the accompanying drawing I have shown my invention in preferred form and by way of example, and as applied to the kind of machine mentioned, but obviously many variations and alterations may be made therein, and in its mode of application and use, which will still be comprised within its spirit.

Generally speaking, I desire it to be understood that I do not limit myself to any specific form or embodiment, except in so far as such limitations are specified in the claims.

Figure 1:
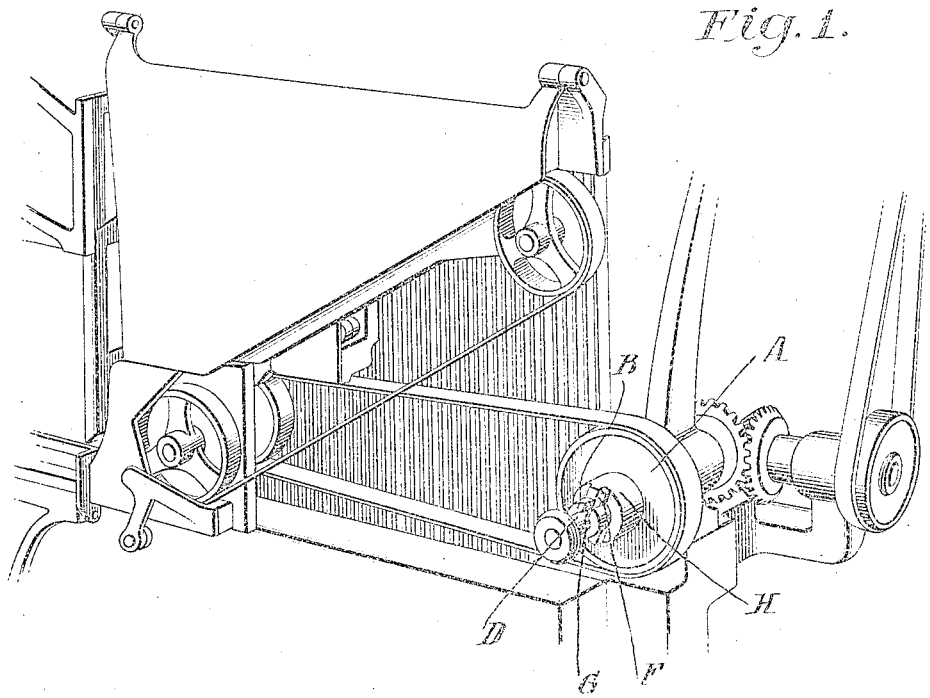
Figure 2:
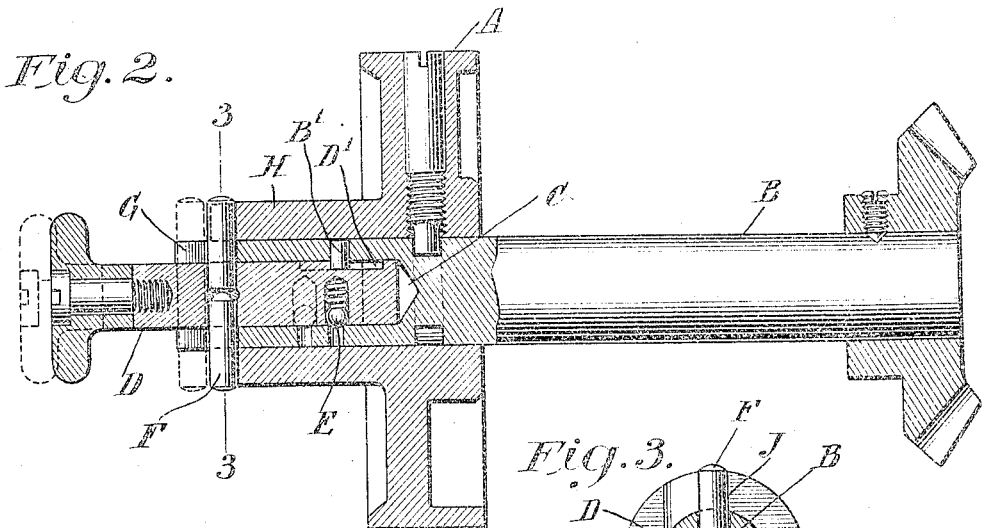
Figure 3:

In the drawing: Figure 1 is a front view of a portion of a linotype machine, with my improvement embodied therein; Fig. 2 is a longitudinal section, on an enlarged scale, through the clutch, etc.; and Fig. 3 is a section taken substantially on the line 3—3 in Fig. 2.

The wheel or pulley A is actuated by any suitable driving means, comprising the rotating shaft B, the wheel being loosely mounted on the shaft, and my improved clutch devices being illustrated as employed in connection therewith. The outer end of the shaft B is longitudinally bored or recessed as at C, and in the recess I dispose the cylindrical element or rod D so as to permit its slight longitudinal movement therein, the extent of this adjustment being controlled by the engagement of the inwardly projecting pin B¹ on the shaft B with the slot D¹ in the rod D. I also provide the rod with detent devices, preferably in the form of a spring pressed ball E, to hold it in its extreme positions in the recess C. The outer end of the shaft B is also formed with two oppositely located notches G designed to receive the transverse coupling pin F carried by the rod D, the depth of the notches being sufficient to permit the longitudinal adjustment of the rod without disengaging the pin therefrom. Due to this constant connection, the rod D is caused to rotate always in unison with the shaft B.

The wheel A is provided with the projecting hub H, mounted in proximity to the pin F, and formed at its ends with the two shoulders J, J. When the rod D is moved inwardly, the pin F is brought into engagement with the said shoulders, and the wheel A is thus operatively connected to the shaft B. The outward movement of the rod, as indicated by dotted lines in Fig. 2, breaks the clutch engagement.

The coupling pin F is preferably of cylindrical form and mounted in the rod D, so as to be capable of an independent rotary movement about its own axis. This feature adds durability to the construction and certainty to the operation. In cases where a flat sided pin or the like is employed, its corners become worn, and the difficulty of engaging it with the hub H, as well as the liability to its accidental disengagement, are both accentuated. With the rotatable cylindrical pin F, new surfaces are being constantly presented, and the wear is thus distributed. Moreover, when the pin is pressed against the end of the hub, and before it engages with the shoulders J, because of its cylindrical shape, the friction is large, reduced, thus diminishing both the wear and the liability to injury of the parts.

As previously stated, I have shown my invention only in preferred form and by way of example, and in a particular mode of application, but obviously many modifications and changes therein will suggest themselves to those skilled in the art, without departure from its scope.

Having thus described my invention, its construction and mode of operation, what I claim and desire to secure by Letters Patent of the United States is as follows:

1. The clutch member comprising in combination two relatively-adjustable parts, one of said parts being provided with a transverse rotatably-mounted coupling pin.

2. The clutch member comprising in combination two relatively-adjustable parts, one of said parts being provided with a transverse rotatably-mounted cylindrical coupling pin, and the other part being formed so as to be engaged and actuated by said pin.

3. The clutch mechanism comprising in combination, the adjustable element D provided with the transverse rotatably-mounted coupling pin F, and the member A formed with the shoulders J adapted to be engaged by said pin.

4. The clutch mechanism comprising in combination, the shaft B, the longitudinally-adjustable element D, the transverse rotatably-mounted coupling pin F carried thereby, and the member A formed with the shoulders J adapted to be engaged by said pin.

5. The clutch mechanism comprising in combination, the shaft B formed with the recess C and the notches G, the longitudinally-adjustable element D mounted in said recess, the transverse rotatably-mounted pin F carried by the element D and having its ends located in said notches, and the member A formed with the shoulders J adapted to be engaged by said pin.

In testimony whereof I affix my signature in presence of two witnesses.

JULIUS W. KREILING.

Witnesses:
JOHN C. MATELING,
PAUL C. MEIER.